Patented Oct. 22, 1946

2,409,798

UNITED STATES PATENT OFFICE 2,409,798

COMPOUNDS OF THE CYCLOPENTANOPOLY-HYDROPHENANTHRENE SERIES AND PROCESS OF MAKING SAME

Tadeus Reichstein, Basel, Switzerland

No Drawing. Application March 20, 1942, Serial No. 435,570. In Switzerland March 21, 1941

5 Claims. (Cl. 260—397.3)

It has been found that compounds of the cyclopentano-polyhydrophenanthrene series unsaturated in ring C can be obtained if compounds of the aetiocholane or pregnane series, which are unsaturated in the neuclus and contain in ring C in the 11-position a free or esterified hydroxyl group as substituent, are subjected to a treatment which eliminates this substituent with formation of a double bond.

Particularly suitable are those compounds of the aetiocholane or pregnane series, unsaturated in the nucleus, which contain the named substituent in ring C and also contain in the positions 3, 7, 17, 20 or 21 a free or substituted carbonyl, hydroxyl or carboxyl group. They may, apart from this, be of any steric configuration. The following compounds may, for example, be used: $\Delta^{4:5}$-11-hydroxy - pregnene-3:20-diones, $\Delta^{4:5}$-11:21-dihydroxy-pregnene-3:20-diones, $\Delta^{4:5}$-11:17:21-trihydroxy - pregnene - 3:20-diones, $\Delta^{4:5}$-11:17 - dihydroxy - pregnene - 3:20 - diones, $\Delta^{4:5}$-11-hydroxy-androstene - 3:17 - diones, $\Delta^{5:6}$-11-hydroxy-aetiocholenic acids. Instead of the compounds named, the corresponding derivatives, partly or completely substituted in the hydroxyl and/or acid groups, may be used, whereby the hydroxyl groups may, for example, be esterified with carboxylic acids such as acetic, propionic or benzoic acid, by sulphonic acids, hydrohalic acids or xanthogenic acids, and the carboxyl groups esterified with any alcohol or phenol, or otherwise substituted. Further utilizable starting products are, for example, such compounds of the aetiocholane series which are unsaturated in the nucleus and contain a free or esterified hydroxyl group in ring C in the 11-position of the cyclopentano-polyhydrophenanthrene skeleton, and which contain on the 17-carbon atom, e. g. in addition to a free, esterified or etherified hydroxyl group, a hydrocarbon radical such as an alkyl, alkenyl, alkinyl or alkylene group. Moreover enol derivatives of ketones such as the enol esters and enol ethers may be used. In this case the enol groupings are generally changed into keto groupings during the elimination of water.

The elimination of the substituent in the 11-position, with formation of a double bond, is carried out by already known methods. For example, a free hydroxyl group may be eliminated by the action of mineral acids, preferably in solvents such as glacial acetic acid, alcohol, dioxane, etc., or by the action of phosphorus oxychloride, bisulphates, formic acid, oxalic acid, acid anhydrides such as acetic anhydride or phosphorus pentoxide, or by the action of catalysts such as salts of iodine or carboxylic acids. An esterified hydroxyl group can also be eliminated with alkalis, alkaline earths, carbonates, carboxylic acid salts, or organic bases such as pyridine, dimethylaniline, etc., in addition to the compounds mentioned above. Instead of, or in combination with the above named compounds, increased temperature and/or reduced pressure may be used. The reaction may also be carried out, if deemed advisable, in the presence of inert gases. Instead of eliminating the hydrogen halide directly from the hydrohalic acid ester, the halogen can be replaced in the known way by a quaternary ammonium radical and this then eliminated.

The elimination products contain a new double bond in ring C of the cyclopentanopolyhydrophenanthrene skeleton, whose position is not absolutely certain. Starting from, for example, $\Delta^{4:5}$-11-hydroxy - 21 - acyloxy - pregnene - 3:20-dione, a mixture is obtained which consists presumably of $\Delta^{4:5:9:11}$-21-acyloxy-pregnadiene-3:20-dione and $\Delta^{4:5:8:9}$-21-acyloxy-pregnadiene-3:20-dione. These substances can be separated by known methods such as fractionated crystallization, sublimation, separation by solvents, conversion into derivatives, chromatography, each of these methods of separation being used alone or in combination with the others.

If the elimination products contain free hydroxyl groups such as secondary nuclear hydroxyl groups or a ketol group in the 17-position, they can be subsequently treated with esterifying or etherifying agents. The etherification and particularly also the conversion into saccharide derivatives is also carried out by already known methods. The acid radicals which are introduced by known methods may be of inorganic or organic, for instance of aliphatic, cycloaliphatic, aliphatic aromatic, aromatic or heterocyclic character, they may be substituted, saturated or unsaturated, or may possess a straight or branched chain. If there have been used esterifying agents which, apart from the ester forming group, contain salt forming groups, such as carboxylic, phenolic or amino groups, the obtained esters may be subsequently converted into the corresponding salts, thus transforming them into water-soluble derivatives. Furthermore, the nuclear hydroxyl groups in the elimination products can be converted into keto groups by oxidizing agents, e. g., with chromic acid in glacial acetic acid or with permanganate, with metals, metallic oxides, metallic alcoholates or phenolates in the presence of carbonyl compounds (acetone, cyclohexanone, etc.). The double bonds present in the nucleus may be temporarily protected by the addition of halogen or halogen halide.

If the elimination products contain, however, nuclear keto groups, the latter may be subsequently converted by means of reduction agents into secondary or tertiary carbinol groups, for example, catalytically (such as by means of hydrogen activated with nickel), by means of aluminium isopropylate and isopropyl alcohol, by means of alkali metal in the presence of alcohols, or by means of compounds of the Grignard type.

The compounds obtained by the above process are therapeutically valuable products or may be converted into such.

The following examples illustrate the invention but are not to be regarded as limiting it in any way. The parts given are by weight:

Example 1

One part of $\Delta^{4:5}$-11:21-dihydroxy-pregnene-3:20-dione-21-acetate (corticosterone acetate, M. Pt. 147.5–148.5° C.) is boiled under reflux with 7.5 parts of a mixture of 80% v./v. glacial acetic acid and 20% v./v. concentrated aqueous hydrochloric acid. The product of the reaction is evaporated down in vacuo and the residue allowed to stand for some time at room temperature with 4 parts of acetic anhydride and 5 parts of absolute pyridine. The mixture is again evaporated down in vacuo and the residue dissolved in a mixture of ether and chloroform, washed with diluted hydrochloric acid, soda solution and water, and dried over sodium sulphate. The product obtained from the ether and chloroform solution is dissolved in 7.5 parts of benzene and pentane (1:1) and filtered over a column of 30 parts aluminium oxide. On developing the chromatogram with benzene and pentane (1:1), a crystalline fraction is first obtained which forms, after recrystallization from ether, needles melting at 142° C. and having a molecular formula $C_{23}H_{30}O_4$. This compound has presumably the following constitution:

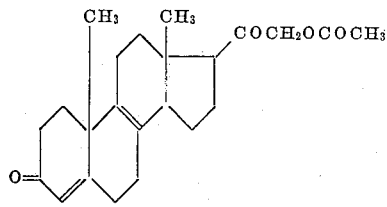

On washing with absolute benzene a further fraction is obtained which gives, after recrystallization from acetone and ether, prismatic crystals melting at 157.5–158.5° C. They have the molecular formula $C_{23}H_{30}O_4$ and probably the following constitution:

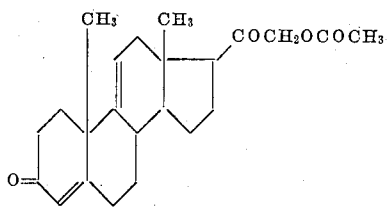

Both compounds are shown in animal experiments to be highly active adrenal cortical hormones. Two products with the same molecular formula $C_{23}H_{30}O_5$ and melting points of 122–125° C. and 147° C. respectively can still be obtained from the column; the quantity varies according to the duration of the reaction. The latter compound consists of the unchanged initial product, whereas the former is an isomer of it. By saponification of the above mentioned compounds the free hydroxy ketones can be obtained.

Instead of esterifying the product of the reaction with acetic anhydride, it can be converted into other esters or into ethers, e. g., by means of propionylating agents or agents forming glucosides. Instead of using the 3-keto compound, one may also start, for example, from the corresponding $\Delta^{5:6}$-3-hydroxy-21-acyloxy-compounds. In this case the $\Delta^{5:6;9:11}$- and $\Delta^{5:6;8:9}$-3-hydroxy-21-acyloxy-pregnadiene-20-ones thus obtained can be converted into the 3-keto compounds described above by oxidation with, for example, chromium trioxide in glacial acetic acid, after temporarily protecting the double bonds.

Instead of the $\Delta^{4:5}$-11:21-dihydroxy-pregnene-3:20-dione-21-acetate, the $\Delta^{4:5}$-11-epi-21-dihydroxy-pregnene-3:20-dione-diacetate may be used as starting material.

Example 2

One part of $\Delta^{4:5}$-11-hydroxy-pregnene-3:20-dione (11-hydroxy-progesterone, M. Pt. 187–188° C.) is boiled for a short time under reflux with 10 parts acetic anhydride and 0.4 parts 50% sulphuric acid, and a large quantity of water added to the reaction mixture. After dissolving in ether and chloroform, the same procedure is adopted as in Example 1. The fraction obtained with benzene and pentane gives, after evaporation and recrystallization from a mixture of ether and pentane, a compound melting at 122° C., molecular formula $C_{21}H_{28}O_2$, and probably having the following constitution:

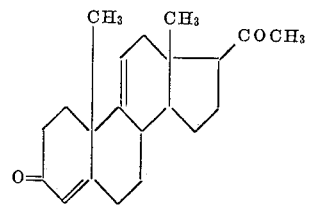

The substance forms colorless crystals and is highly active when tested for its corpus luteum hormone action. In addition to unchanged 11-hydroxy-progesterone a further compound can then be extracted with benzene and ether or with absolute ether which has presumably the following constitution:

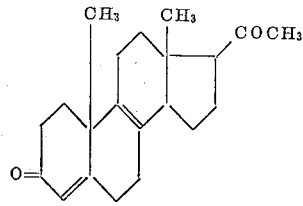

The same products are obtained if, instead of the $\Delta^{4:5}$-11-hydroxy-pregnene-3:20-dione, the corresponding 3-enol-acetate is used and the enol groupings of the products of the reaction completely saponified after the elimination of water. The same result is obtained by eliminating water from $\Delta^{5:6}$-3:11-dihydroxy-pregnene-20-one and subsequent oxidation with chromic acid with temporary protection of the double bond by addition of bromine in glacial acetic acid. The oxidation can also be carried out by heating with aluminium isopropylate, tertiary butylate or phenolate in the presence of acetone, cyclohexanone etc.

The corresponding $\Delta^{4:5:8:9}$- and $\Delta^{4:5:9:11}$-dienic acids can be obtained in a similar way from $\Delta^{5:6}$-3-hydroxy or -acyloxy or $\Delta^{4:5}$-3-keto-11-hydroxy-aetio-chlolenic acid.

*Example 3*

One part of $\Delta^{4:5}$-11-hydroxy-androstene-3:17-dione (M. Pt. 225° C.) is treated with 5 parts of a mixture of glacial acetic acid and concentrated aqueous hydrochloric acid, as in Example 1, and the resulting solution completely evaporated. The residue is chromatographed over aluminium oxide, whereby two crystalline products with the same molecular formula $C_{19}H_{22}O_2$ can be separated off. They consist presumably of $\Delta^{4:5:9:11}$- and $\Delta^{4:5:8:9}$-androstadiene-3:17-dione with the following constitutions:

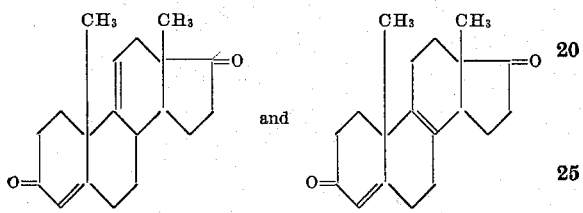

Analogous compounds of the aetiocholane series with a newly introduced double bond in ring C are also obtained by starting from 11-hydroxy-androstanes unsaturated in the nucleus which have on the 17-carbon atom a hydrocarbon radical such as an alkyl, alkenyl, alkinyl or alkylene group and/or a free esterified or etherified hydroxyl group.

What I claim is:

1. A compound having the following structural formula

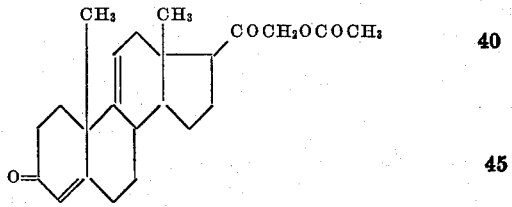

2. A compound having the following structural formula

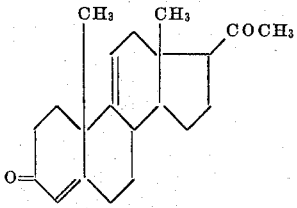

3. A compound having the structural formula:

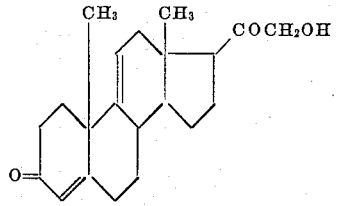

4. A compound having the structural formula:

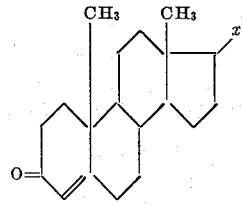

wherein the C ring contains a carbon-to-carbon double bond, one of such carbons being the 9 carbon, and wherein $x$ is a member selected from the group consisting of —COCH₂Oacyl, —COCH₃, and —COCH₂OH.

5. A compound having the structural formula:

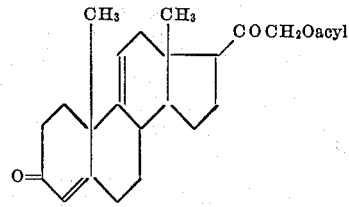

TADEUS REICHSTEIN.